Aug. 7, 1934.  C. P. COOK  1,969,208

METHOD FOR BRANDING PORK LOINS

Filed Nov. 6, 1930  2 Sheets-Sheet 1

Calvin P. Cook
INVENTOR.

BY Foy W. Johns
ATTORNEY

WITNESS -

Aug. 7, 1934.    C. P. COOK    1,969,208
METHOD FOR BRANDING PORK LOINS
Filed Nov. 6, 1930    2 Sheets-Sheet 2

Calvin P. Cook
INVENTOR.

BY Roy W. Johns.
ATTORNEY

Patented Aug. 7, 1934

1,969,208

UNITED STATES PATENT OFFICE 1,969,208

METHOD FOR BRANDING PORK LOINS

Calvin Porter Cook, Arlington, Mass., assignor to Swift and Company, Chicago, Ill., a corporation of Illinois Application November 6, 1930, Serial No. 493,797

3 Claims. (Cl. 101—32)

My invention relates to the branding of meats, particularly pork loins.

One of the objects of this invention is to provide an improved method of applying a dry pigment to the surface of the meat with a cutting or penetrating tool.

Other objects of my invention will be apparent from the description and claims which follow.

Any appropriate tool may be used to carry out my invention but for purposes of illustration, I will describe a preferred form of branding tool.

In the drawings, Figure 1 is a side view of an improved branding tool.

Figure 1:
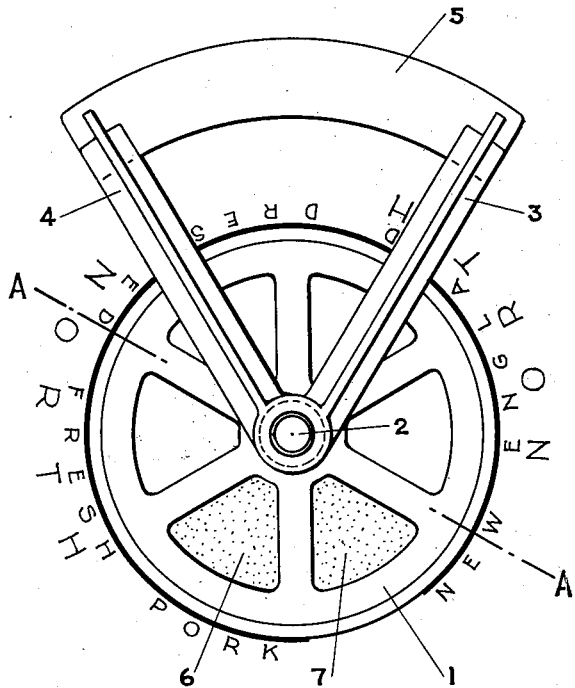
Figure 2:
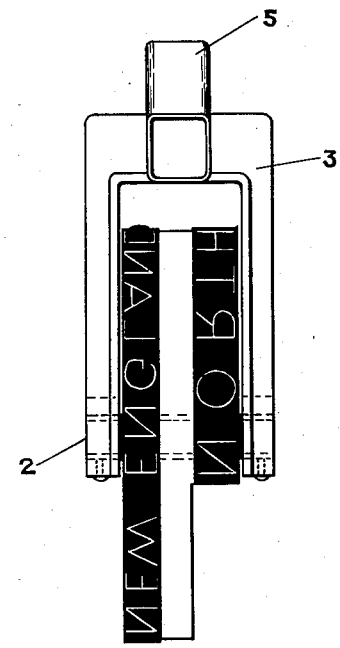
Figure 2 is a front view thereof.
Figure 3:
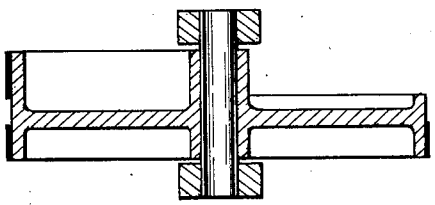
Figure 3 is a sectional view through "AA", Figure 1.
Figure 4:
Figure 4 is a sectional view through one of the supporting arms of the handle.
Figure 5:
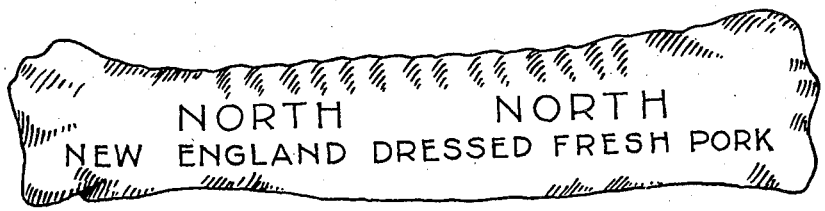
Figure 5 represents a cut of meat such as a pork loin with the brand applied thereto.
Figures 6, 7:
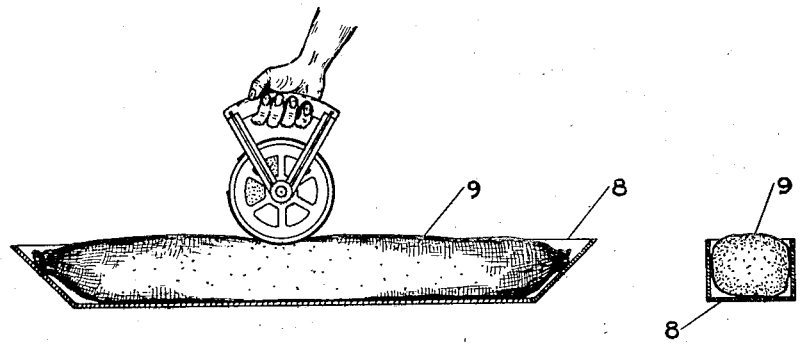
Figure 6 shows in perspective a pigment container with one side of the pan removed and shows how the pigment is applied to the branding tool.
Figure 7 is a transverse sectional view of the pigment container.

A wheel 1 is axially mounted on a shaft 2 to which is secured handle supports 3 and 4 supporting handle 5. Wheel 1 is provided with two rows of lettering, letters being of the blade-like projecting type. In the tool as shown, one row of lettering occupies slightly over half the circumference of the wheel, the other row continuing around the entire circumference. The spacing of letters is indicated by lettering about the circumference of the wheel in Figure 1. Counter weights 6 and 7 are provided to assure that each brand is commenced at the beginning of the lettering. In Figure 6, pan 8 holds a stockinet tubing 9 which is filled with a pigment such as paprika. The fabric being porous permits sufficient of the paprika to pass through upon application of pressure to deposit enough paprika on the blade-like projecting letters to give a clear compressed brand. The stockinet tubing 9, being porous, acts as a strainer through which the paprika passes upon application of the cutting tool to the same. The tubing or container 9 confines the paprika or other pigment, preventing unnecessary waste of the material, and prevents an excessive application of the paprika to the cutting tool, thereby obviating the necessity of removing an excessive quantity of paprika or other pigment from the tool prior to printing.

It is known, of course, that a powdered pigment such as paprika will adhere to the grease covered letters of a brander of the blade-like projecting type. However, if the letters are dipped directly into the loose paprika, it is necessary to remove the excess paprika adhering to the letters before branding. By my method of encasing the paprika in a stockinet, this step is eliminated and assures a clearer brand.

I claim:

1. The method of branding meat which consists, first, in causing a powdered pigment to adhere to the sides of the blades of knife like branding elements mounted upon a roller branding device by rolling the device over a supply of the powdered pigment, and subsequently rolling the device over the surface of the meat to be branded, depositing the pigment in the cuts formed by the branding elements.

2. The method of branding meat which consists first in applying a cutting tool in limited contact with a powdered pigment to cause adherence of a limited amount of the pigment to the tool, and subsequently operating the cutting tool on the surface of the meat to be branded to thereby apply identifying indicia exposed on the surface of the meat.

3. The method of branding meat which consists first in applying a cutting tool to the surface of a porous container containing powdered pigment to cause adherence of a limited amount of pigment to the tool and subsequently operating the cutting tool on the surface of the meat to be branded to thereby apply identifying indicia to the surface of the meat.

CALVIN PORTER COOK.